United States Patent
Hirata et al.

(10) Patent No.: US 8,599,654 B2
(45) Date of Patent: Dec. 3, 2013

(54) HEAD GIMBAL ASSEMBLY USING NEAR-FIELD LIGHT AND INFORMATION RECORDING AND REPRODUCING APPARATUS INCLUDING THE SAME

(75) Inventors: Masakazu Hirata, Chiba (JP); Manabu Oumi, Chiba (JP); Norio Chiba, Chiba (JP); Sachiko Tanabe, Chiba (JP); Yoko Shinohara, Chiba (JP)

(73) Assignee: Seiko Instruments Inc. (JP)

( * ) Notice: Subject to any disclaimer, the term of this patent is extended or adjusted under 35 U.S.C. 154(b) by 258 days.

(21) Appl. No.: 12/924,551

(22) Filed: Sep. 29, 2010

(65) Prior Publication Data

US 2011/0075527 A1     Mar. 31, 2011

(30) Foreign Application Priority Data

| Sep. 30, 2009 | (JP) | 2009-228973 |
| Sep. 30, 2009 | (JP) | 2009-228974 |
| Feb. 12, 2010 | (JP) | 2010-029427 |
| Mar. 3, 2010 | (JP) | 2010-047188 |

(51) Int. Cl.
*G11B 5/02*     (2006.01)
*G11B 5/48*     (2006.01)

(52) U.S. Cl.
USPC ............ 369/13.33; 369/112.27; 360/59; 360/244.2; 360/244.1; 360/245; 360/245.9

(58) Field of Classification Search
USPC ......... 360/245–245.9, 244–244.9; 369/13.33, 369/112.27
See application file for complete search history.

(56) References Cited

U.S. PATENT DOCUMENTS

| 5,351,229 | A  | * | 9/1994 | Brezoczky et al. | 369/99 |
| 6,351,348 | B1 | * | 2/2002 | Erpelding et al. | 360/244.3 |
| 2002/0009262 | A1 | * | 1/2002 | Kasama et al. | 385/36 |
| 2004/0202055 | A1 | * | 10/2004 | Knight et al. | 369/13.33 |
| 2006/0233061 | A1 | * | 10/2006 | Rausch et al. | 369/13.32 |
| 2007/0070824 | A1 | * | 3/2007 | Nishida et al. | 369/13.02 |
| 2010/0007980 | A1 | * | 1/2010 | Kim et al. | 360/59 |

OTHER PUBLICATIONS

Patent Abstracts of Japan, publication No. 2002-298302, publication date Oct. 11, 2002.
Patent Abstracts of Japan, publication No. 2008-152899, publication date Jul. 3, 2008.

* cited by examiner

*Primary Examiner* — Wayne Young
*Assistant Examiner* — Dionne Pendleton
(74) *Attorney, Agent, or Firm* — Adams & Wilks

(57) ABSTRACT

A head gimbal assembly has a flexure forming a part of a suspension configured to extend along a surface of a recording medium. A flexible substrate is provided on the flexure. A slider is mounted onto at least a part of the flexible substrate so as to oppose the surface of the recording medium, and is configured to generate near field light from an introduced light flux. A light supply portion is mounted on the flexure and is provided between the flexure and the slider. The flexible substrate has an end surface forming a mirror surface that faces an end surface of the light supply portion and is inclined with respect to an optical axis of the light supply portion. The light supply portion is optically coupled to the slider via the mirror surface of the flexible substrate.

21 Claims, 15 Drawing Sheets

A-A' CROSS SECTION

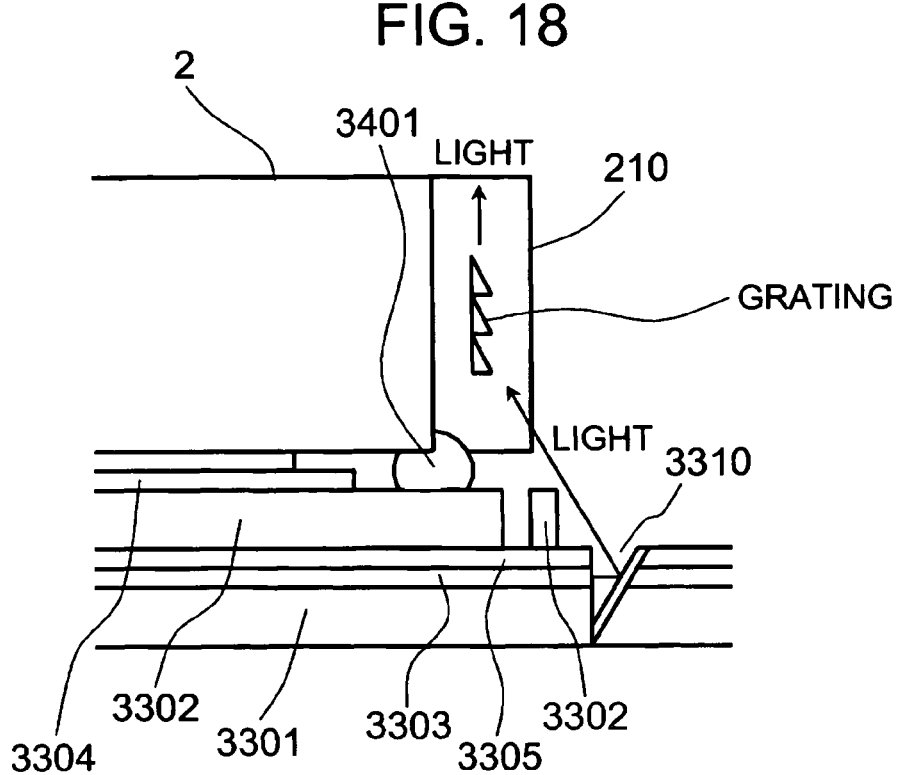
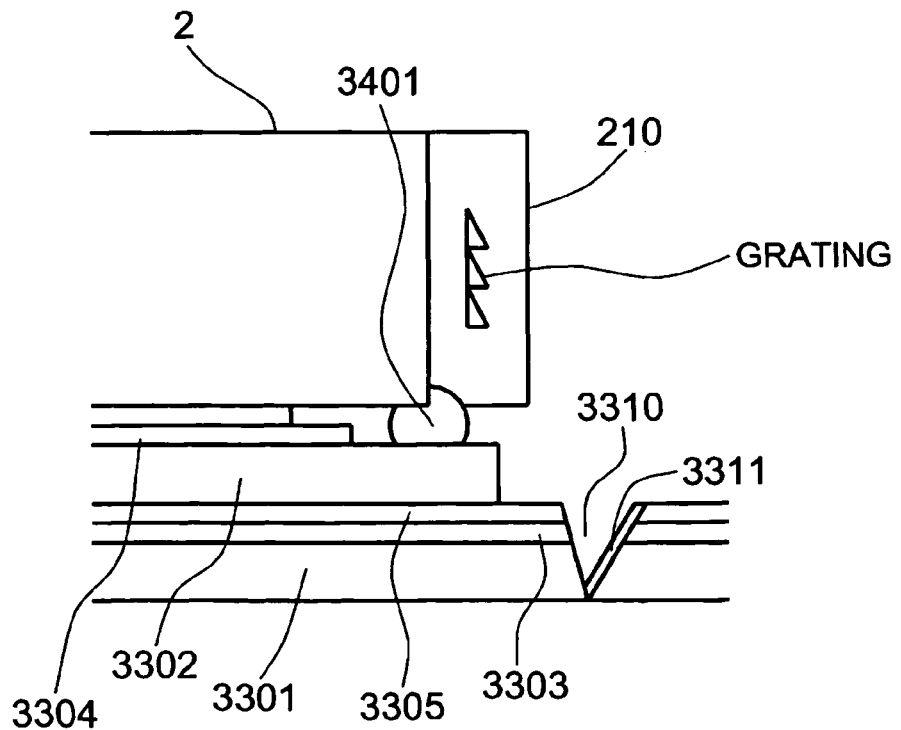

3301 — STAINLESS STEEL THIN PLATE

3303

3302

3305

HEAD GIMBAL ASSEMBLY USING NEAR-FIELD LIGHT AND INFORMATION RECORDING AND REPRODUCING APPARATUS INCLUDING THE SAME

BACKGROUND OF THE INVENTION

1. Field of the Invention

The present invention relates to a head gimbal assembly that records and reproduces various types of information into and from a recording medium using spot light formed by collecting light, and an information recording and reproducing apparatus using the head gimbal assembly.

2. Background Art

Recently, there has been a demand for further higher density of an information recording and reproducing apparatus, such as a hard disc drive in a computer device, in order to meet needs, such as to perform high-volume and high-density information recording and reproduction. To this end, recording media having a strong coercivity are now being adopted to minimize influences of one magnetic domain to an adjacent magnetic domain and vice versa and heat fluctuation. This, on the contrary, is making it difficult to record information in recording media.

In order to eliminate the inconvenience described above, there has been proposed an information recording and reproducing apparatus of a hybrid magnetic recording method configured to write information into a disc while the coercivity is lowered temporarily by heating a magnetic domain locally using spot light formed by collecting light or near-field light formed by collecting light. In particular, when near-field light is used, it becomes possible to handle optical information in a region as small as or smaller than a wavelength of light, which has been assumed to be the limit of an optical system in the related art. A higher-density recording bit exceeding that of an optical information recording and reproducing apparatus in the related art can be thus achieved.

There have been various types of information recording and reproducing apparatus of the hybrid magnetic recording method described above and one type is configured to supply light from which to generate near-field light to a near-field light element so that the near-field light element generates near-field light that is sufficiently large to achieve ultra-high resolution recording and reproduction, high-speed recording and reproduction, and a high S-to-N ratio. This information recording and reproducing apparatus allows a slider equipped with the near-field light element to scan over a recording medium and locates the slider at a desired position above the recording medium. Thereafter, by allowing near-field light emitted from the light source to cooperate with a recording field generated from the slider, information can be recorded into the recording medium.

As a light supply scheme in the hybrid magnetic recording method, there is a configuration known as a head gimbal assembly in which an optical waveguide is provided on the suspension as is described, for example, in Japanese Patent No. 4162697. There is also a configuration by which light is supplied using an optical fiber and an optical prism as is described in JP-A-2002-298302.

The head gimbal assembly in the related as described above, however, cannot supply light sufficiently. In Japanese Patent No. 4162697, as is shown in its accompanying FIG. 2, it is not anticipated to collect light exiting from the optical waveguide. It is therefore impossible to collect sufficient energy to a microscopic region comparable to 1-bit data and hence to achieve a higher-density recording bit by the hybrid magnetic recording. In order to generate a sufficiently small light spot and irradiate the light spot to a disc, it is preferable to provide a light-collecting element or a near-field light element inside the slider. In this case, however, it becomes necessary to direct light to be incident on a predetermined position of the slider. In Japanese Patent No. 4162697, because both the optical waveguide and the slider are provided on a base insulating layer (flexible substrate), it is difficult to direct light to be incident on the predetermined position of the slider.

In addition, the optical waveguide is bent at a curvature radius small enough not to interfere with an action of the suspension that controls stable levitation of the slider. It is, however, difficult for the optical waveguide to hold light within its core when bent at such a small curvature radius. As a result, there is a possibility that the information recording and reproducing apparatus fails to record information into a recording medium because the magnetic domain is not heated sufficiently during an information recording action.

Meanwhile, the configuration of JP-A-2002-298302 has no serious problem in propagation of light. However, a component, such as an optical prism, has to be fixed to the slider or the suspension. As a result, the manufacturing costs are increased and there is a concern that an increase in weight deteriorates levitation of the slider.

SUMMARY OF THE INVENTION

The invention was devised in view of the foregoing, and has an object to provide a recording head gimbal assembly using near-field light that achieves both of an efficient connection between a near-field light element inside a slider and a light source outside the slider and stable levitation of the slider, and to provide an information recording and reproducing apparatus using the head gimbal assembly.

A recording head gimbal assembly using near-field light according to an aspect of the invention includes: a flexure forming a part of a suspension extended along a surface of a recording medium; a flexible substrate provided on the flexure; a slider fixed onto at least a part of the flexible substrate so as to oppose the surface of the recording medium and generating a near field using a light flux; and a light supply portion fixed to the flexure. At least apart of the flexible substrate forms a mirror surface inclined with respect to an optical axis of the light supply portion, and the light supply portion is optically coupled to the slider via the mirror surface.

In the recording head gimbal assembly using near-field light configured as above, a more compact light bending structure can be achieved by using the side surface of the flexible substrate as the mirror surface. In addition, because components added for light bending can be reduced to the minimum, the light bending structure can be achieved at a low cost and performance of the head gimbal assembly is not deteriorated by an increase in weight.

The recording head gimbal assembly using near-field light may be configured in such a manner that it further includes electric wires provided to the flexible substrate.

The recording head gimbal assembly using near-field light maybe configured in such a manner that the electric wires are provided inside the flexible substrate and electrically isolated from the flexure.

The recording head gimbal assembly using near-field light may be configured in such a manner that a part of the flexible substrate is the light supply portion.

The recording head gimbal assembly using near-field light may be configured in such a manner that the flexible substrate and at least a part of a portion in the light supply portion mounted on the flexure are made of a same material and of a same thickness.

In the recording head gimbal assembly using near-field light configured as above, the flexible substrate and a portion of the optical supply portion mounted on the flexure are obtained by processing the same resin film by photolithography or the like. The head gimbal assembly can be therefore manufactured at a low cost.

The recording head gimbal assembly using near-field light may be configured in such a manner that at least a part of the light supply portion is an optical waveguide formed of a core through which the light fluxes passes and a cladding (clad) coating the core.

The recording head gimbal assembly using near-field light may be configured in such a manner that the flexible substrate includes the core and the clad.

In the recording head gimbal assembly using near-field light configured as above, the waveguide and the electric wires can be formed integrally into one piece as a photoelectric composite wire. The head gimbal assembly can be therefore manufactured efficiently.

The recording head gimbal assembly using near-field light may be configured in such a manner that at least a part of the light supply portion is a laser.

The recording head gimbal assembly using near-field light may be configured in such a manner that at least one of the electric wires is connected to the light supply portion.

The recording head gimbal assembly using near-field light may be configured in such a manner that it further includes a metal film provided to the mirror surface.

The recording head gimbal assembly using near-field light configured as above is able to improve reflectance of the mirror surface. Light from the light supply portion can be therefore transmitted efficiently to the slider.

The recording head gimbal assembly using near-field light may be configured in such a manner that the flexible substrate includes a notch, and that the notch includes the mirror surface.

The recording head gimbal assembly using near-field light may be configured in such a manner that the notch is formed of a V-shaped groove made up of a first surface and a second surface, and that the first surface is the mirror surface and the second surface is a light-exiting end of the light supply portion.

In the recording head gimbal assembly using near-field light configured as above, the function of reflecting light is furnished by merely providing a notch in the flexible substrate. The overall configuration can be therefore simpler, which can in turn enhance the ease with which the head gimbal assembly is manufactured.

The recording head gimbal assembly using near-field light may be configured in such a manner that it further includes electric wires provided to the flexible substrate, and connection pads used to electrically connect the slider and the electric wires and provided to the flexible substrate, so that the notch is provided closer to a tip end of the suspension than a connecting point of the connection pads and the electric wires.

In the recording head gimbal assembly using near-field light configured as above, the notch can be formed without cutting the electric wires. Hence, stable communications of electric signals to the slider can be achieved and high-intensity light can be supplied to the near-field light generation element in a stable manner. High-density and stable rewriting and recording can be thus achieved.

The recording head gimbal assembly using near-field light may be configured in such a manner that it further includes a guide provided on the flexure, which is used to position the light supply portion on the flexure and made of a same material and of a same thickness as the flexible substrate.

In the recording head gimbal assembly using near-field light configured as above, the flexible substrate and the guide are obtained by processing the same resin film by photolithography or the like. Hence, there is no need to process the guide separately, which makes it possible to obtain a fixing structure of the light supply portion at a low cost.

The recording head gimbal assembly using near-field light may be configured in such a manner that the flexible substrate and the guide are formed integrally into one piece.

In the recording head gimbal assembly using near-field light configured as above, the light supply portion can be fixed up to the vicinity of the mirror surface by the guide. Hence, the optical axis of light emitted from the light supply portion is hardly disturbed. Energy can be therefore transmitted efficiently to the near-field light element.

The recording head gimbal assembly using near-field light may be configured in such a manner that at least one of side surfaces of the guide is inclined with respect to an optical axis of the light supply portion.

In the recording head gimbal assembly using near-field light configured as above, when a mirror surface inclined by a predetermined angle is used, a dicing blade with an edge having a V-shaped cross section or a trapezoidal cross section can be used. The structure can be therefore processed readily at a low cost. Further, because a distance between the guide and the mirror surface can be shortened, the light supply portion can be fixed up to the vicinity of the mirror surface by the guide. Hence, the optical axis of light emitted from the light supply portion is hardly disturbed. Energy can be therefore transmitted efficiently to the near-field light element.

The recording head gimbal assembly using near-field light may be configured in such a manner that the light supply portion is as thick as or thinner than the flexure.

The recording head gimbal assembly using near-field light may be configured in such a manner that the suspension includes an opening provided in a part of a periphery of the flexure, and that the optical waveguide is provided to bridge across the opening.

The recording head gimbal assembly using near-field light may be configured in such a manner that the flexible substrate is made of resin.

An information recording and reproducing apparatus according to another aspect of the invention includes a recording medium, and the recording head gimbal assembly using near-field light configured as above.

In the information recording and reproducing apparatus configured as above, after the recording medium is started to rotate, a carriage is turned about a pivot shaft for the slider supported on the suspension to scan over the recording medium. The slider is then located to a desired position above the recording medium. Thereafter, a light flux is injected into a waveguide from a light source. Accordingly, various types of information can be recorded into and reproduced from the recording medium using the slider of the head gimbal assembly.

In particular, because the information recording and reproducing apparatus includes the head gimbal assembly configured as above, information can be recorded and reproduced precisely at high density, which can enhance the quality. In addition, it becomes possible to manufacture an inexpensive information recording and reproducing apparatus with a stable performance.

According to the recording head gimbal assembly using near-field light configured as above, both of an efficient connection between the near-field light element inside the slider and the light source outside the slider and stable levitation of the slider can be achieved. It thus becomes possible to provide a high-performance information recording and reproducing apparatus.

BRIEF DESCRIPTION OF THE DRAWINGS

FIG. 18 is a cross section used to describe a head gimbal assembly according to a ninth embodiment of the invention;

FIG. 19 is a cross section used to describe a head gimbal assembly according to a tenth embodiment of the invention;

DETAILED DESCRIPTION OF THE PREFERRED EMBODIMENTS

First Embodiment

Figure 1:
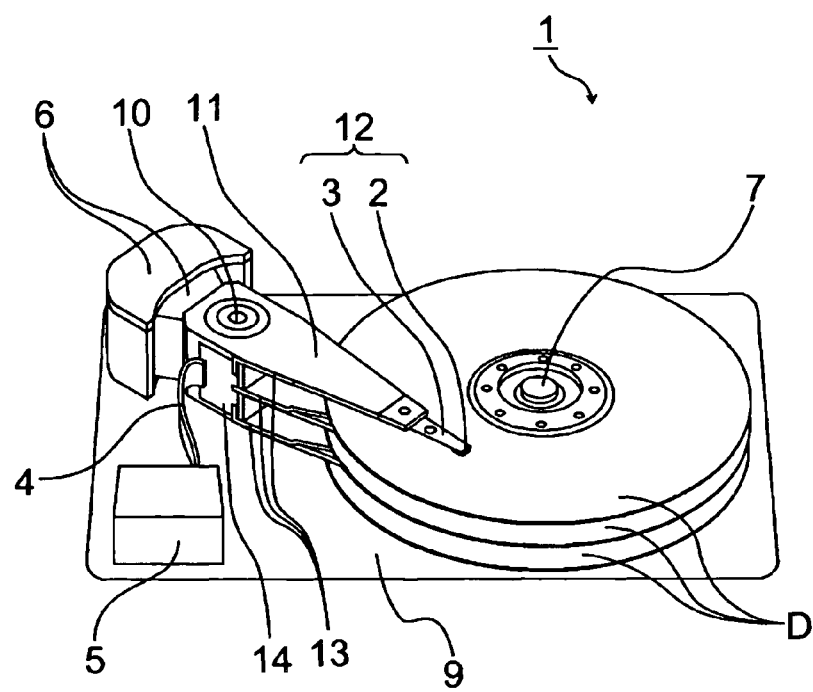
FIG. 1 is a view showing the configuration of an information recording and reproducing apparatus according to a first embodiment of the invention.

Hereinafter, a first embodiment of the invention will be described with reference to FIG. 1 through FIG. 4. FIG. 1 is a view showing the configuration of an information recording and reproducing apparatus 1 of this embodiment. The information recording and reproducing apparatus 1 of this embodiment is an apparatus that writes information into a recording medium D having a magnetic recording layer by a thermal-assist magnetic recording method.

As is shown in FIG. 1, in the information recording and reproducing apparatus 1 of this embodiment, a slider 2 is fixed to a suspension 3 and the suspension 3 is fixed to a carriage 11. The slider 2 and the suspension 3 are together called a head gimbal assembly 12. Disc-shaped recording media D are rotated in a predetermined direction by a spindle motor 7. The carriage 11 is rotatable about a pivot 10. The carriage 11 is rotated by actuators 6 controlled by a control signal from a control portion 5. The carriage 11 is capable of locating the slider 2 at a predetermined position above the surface of one recording medium D. A housing 9 is made of aluminum or the like in a box shape (in FIG. 1, the peripheral wall surrounding the periphery of the housing 9 is omitted for ease of illustration). The components described above are accommodated in the housing 9. The spindle motor 7 is fixed to the bottom surface of the housing 9. The slider 2 has a magnetic pole (not shown) that generates a magnetic field toward the recording medium D, a near-field light element (not shown) that generates a near-field light spot, and a reproduction element (not shown) that reproduces information recorded in the recording medium D. The magnetic pole and the reproduction element are connected to the control portion 5 via a flexible wire 13 installed along the suspension 3 and the carriage 11 and a terminal 14 and a flat cable 4 provided to a side surface of the carriage 11.

Only one recording medium D may be provided or more than one recording medium D may be provided as is shown in FIG. 1. The number of head gimbal assemblies 12 increases as the number of the recording media D increases. FIG. 1 shows a configuration in which one head gimbal assembly 12 is provided to only one side of each recording medium D. It should be appreciated, however, that the head gimbal assemblies 12 may be provided to the both sides. The number of head gimbal assemblies 12 is therefore twice as large as the number of the recording media D at maximum. Owing to this configuration, it becomes possible to increase a recording capacity for a single information recording and reproducing apparatus.

Figure 2:
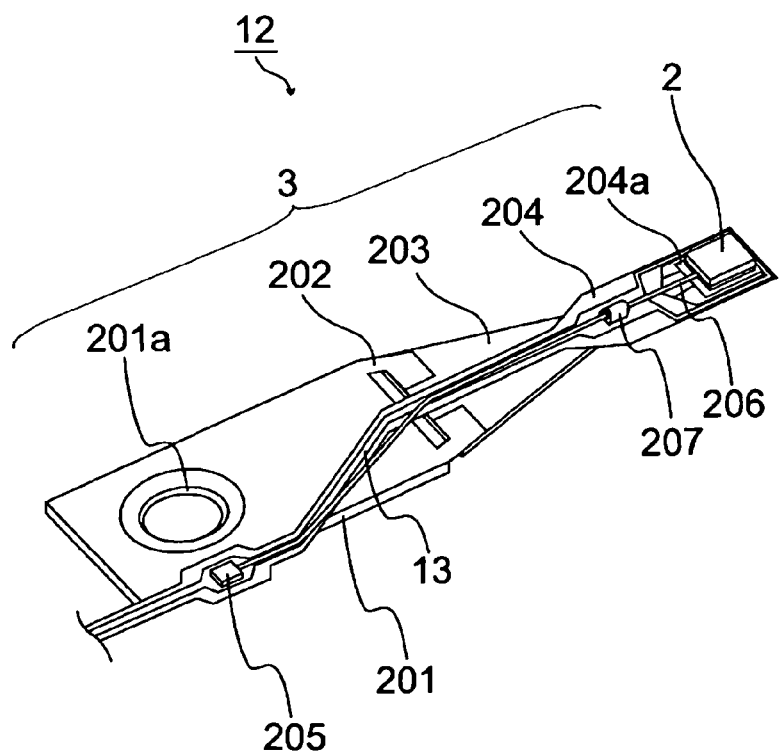
FIG. 2 is a perspective view of a head gimbal assembly shown in FIG. 1.

FIG. 2 is an enlarged view of the head gimbal assembly 12 of the first embodiment. The suspension 3 is formed of a base plate 201 made of a stainless thin plate, a hinge 202, a load beam 203, and a flexure 204. The base plate 201 is fixed to the carriage 11 via an attachment 201a made in a part thereof. The hinge 202 connects the base plate 201 and the load beam 203. The hinge 202 is thinner than the base plate 201 and the load beam 203, and the suspension 3 bends about the hinge 202. The flexure 204 is an elongate member fixed to the load beam 203 and the hinge 202 and it is thinner than the load beam 203 and the base plate 201 and therefore bends readily. The slider 2 of substantially a rectangular prism shape is fixed at the tip end of the flexure 204.

Of the surfaces of the slider 2, the surface opposite to the surface fixed to the flexure 204 opposes the recording medium D. This is the surface that generates a pressure causing the slider 2 to levitate from viscosity of an airflow generated by the rotating recording medium D. This surface is referred to as an ABS (Air Bearing Surface). An unillustrated concavo-convex shape is provided on the ABS. The ABS generates a desired pressure distribution between the slider 2 and the recording medium D. The slider 2 is allowed to levitate in a desired state as a positive pressure that forces the slider 2 to move away from the recording medium D, a negative pressure that forces the slider 2 to be attracted to the recording medium D, and a pressing force by the suspension 3 are balanced out. The minimum value of a clearance between the recording medium D and the slider 2 is about 10 nm or less. The pressing force by the suspension 3 is generated chiefly by elasticity of the hinge 202. The hinge 202 and the flexure 204 bend correspondingly to undulation of the surface of the recording medium D, which makes it possible to maintain a desired levitation state.

The flexible wire 13 is provided on the flexure 204. The flexure 204 has substantially a U-shaped opening. The flexure 204 has a pad portion 204a surround by this opening and thereby shaped like a tongue, on which the slider 2 is fixed. Of the ends of the slider 2, the end on the root side of the suspension 3 (on the side of the carriage 11) is referred to as the flow-in end and the opposite end on the tip end side of the suspension 3 is referred to as the flow-out end of the slider 2. These ends are named according to directions of an airflow generated by the recording medium D. The magnetic pole (not shown), the near-field light element (not shown), and the reproduction element (not shown) are provided to the slider 2 on the side surface at the flow-out end. The flexible wire 13 extended from the root side of the suspension 3 branches to two wires at a midpoint and the branched wires are connected to the magnetic pole and the reproduction element at the flow-out end while circling around the opening described above and the both sides of the slider 2.

A laser 205 is provided to the flexure 204 in a part of a portion mounted on the base plate 201. The laser 205 and the flexible wire 13 are electrically connected to each other and the laser 205 is operated to emit light according to an electric signal from the control portion 5. An optical fiber 206 is optically connected to the light-emitting end of the laser 205. The other end of the optical fiber 206 is optically coupled to the near-field light element (not shown) provided to the slider 2. Light from the laser 205 is thus introduced into the near-field light element via the optical fiber 206. The optical fiber 206 is supported by a sleeve 207 in such a manner that the optical fiber 206 is free in the longitudinal direction. As has been described, when the information recording and reproducing apparatus 1 is in operation, the hinge 202 and the flexure 204 bend correspondingly to undulation of the recording medium D. However, because the sleeve 207 supports the optical fiber 206, interference with bending of the hinge 202 and the flexure 204 by the optical fiber 206 is suppressed. The slider 2 is thus allowed to levitate in a stable manner.

Figure 3:
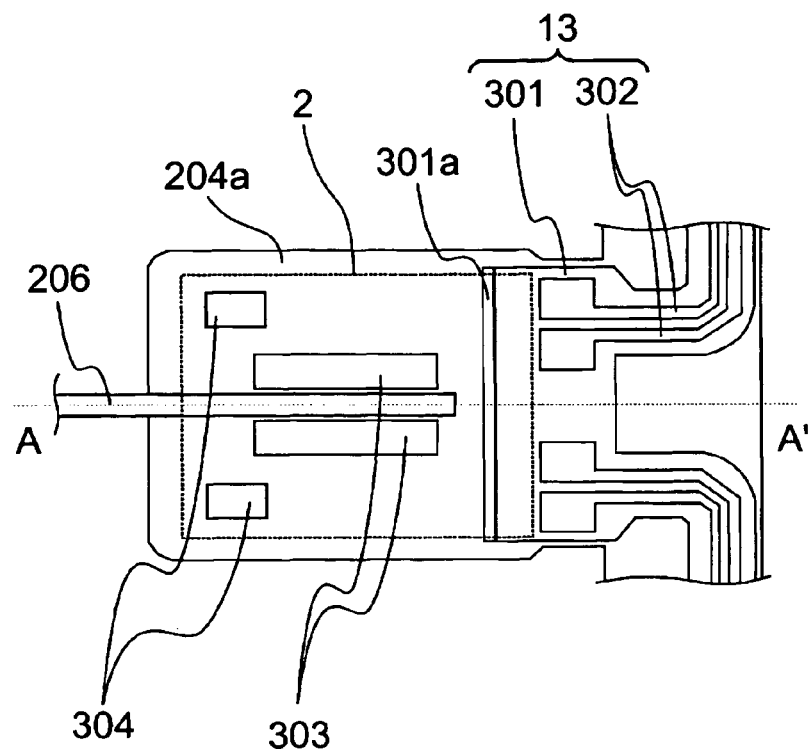
FIG. 3 is an enlarged view of the head gimbal assembly shown in FIG. 2.
Figure 4:
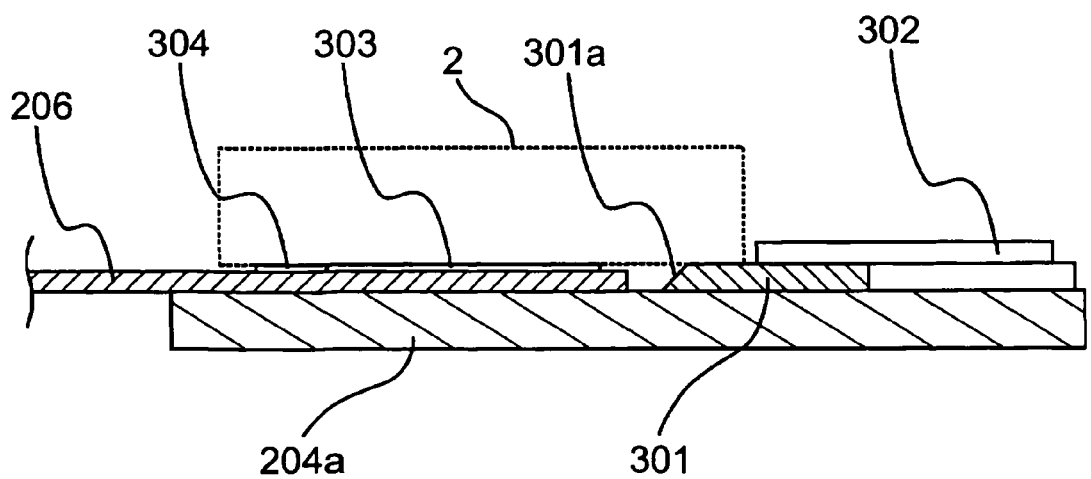
FIG. 4 is a cross section taken on line A-A' of FIG. 3.

FIG. 3 is an enlarged view in the vicinity of the pad portion 204a of the first embodiment. FIG. 4 is a cross section taken on line A-A' of FIG. 3. The flexible wire 13 is formed of a flexible substrate 301 and four metal wires 302 mounted thereon. The flexible substrate 301 is made of resin, such as polyimide. The metal wires 302 are made of copper and the surfaces therefore are plated with gold. The flexible substrate 301 electrically isolates the metal wires 302 from the flexure 204. Although it is not shown in the drawing, a part of the metal wires 302 is coated with resin, such as polyimide, as a protective overcoat. The four metal wires 302 are connected to the magnetic pole (not shown) and the reproduction element (not shown) provided to the slider 2; two to the former and the other two to the latter. It should be appreciated, however, that the number of the metal wires 302' is not limited to four and the number can be increased or decreased when the necessity rises.

Fiber guides 303 and spacers 304, which are made of the same material and of the same thickness as the flexible substrate 301, are provided on the pad portion 204a. The fiber guides 303 are provided in two pairs and each is of a rectangular shape when viewed in a plane. The optical fiber 206 is positioned with respect to the pad portion 204a so as to be sandwiched between two pairs of the fiber guides 303. The slider 2 is bonded and fixed in such a manner that it mounts on a part of the flexible substrate 301 where the metal wires 302 are not mounted and on the fiber guides 303 and the spacers 304. Because the flexible substrate 301, the fiber guides 303, and the spacers 304 are of the same thickness, the slider 2 can be fixed in a stable manner. The spacers 304 are provided as needed to fix the slider 2 to the pad portion 204a in a stable manner. Herein, two pairs of the spacers 304 are provided at the flow-in end of the slider 2. Of the end faces of the flexible substrate 301, the face opposing the optical fiber 206 and the fiber guides 303 is an inclined plane inclined by 45 degrees with respect to the longitudinal direction of the optical fiber 206. By coating this inclined plane with metal, a mirror surface 301a is obtained. Aluminum or gold is used as coating metal. Hence, light exiting from the optical fiber 206 provided to be sandwiched between the slider 2 and the pad portion 204a is bent by 90 degrees on the mirror surface 301a and introduced into the near-field light element (not shown) provided inside the slider 2. It is preferable that the thicknesses of the flexible substrate 301, the fiber guides 303, and the spacers 304 are equal to or less than the diameter of the optical fiber 206. The diameter of the optical fiber 206 is several tens μm to 125 μm. As the diameter of the optical fiber 206 becomes smaller, the distance between the slider 2 and the pad portion 204a becomes shorter, which makes the levitation of the slider 2 satisfactory. Alternatively, the diameter of the optical fiber 206 may be made smaller only in a portion mounted on the pad portion 204a.

Owing to this configuration, a compact light bending structure can be achieved with the use of the mirror surface 301a. Also, by converting a part of the flexible substrate 301 into the mirror surface 301a, the light bending structure can be achieved at a low cost. In addition, because components added for light bending can be reduced to the minimum, the performance of the head gimbal assembly 12 is not deteriorated by an increase in weight.

Furthermore, because the flexible substrate 301, the fiber guides 303, and the spacers 304 are obtained by processing the same resin film by photolithography or the like, there is no need to perform processing separately for the fiber guides 303 and the spacers 304. It thus becomes possible to obtain an optical fiber fixing structure at a low cost.

Second Embodiment

Figure 5:
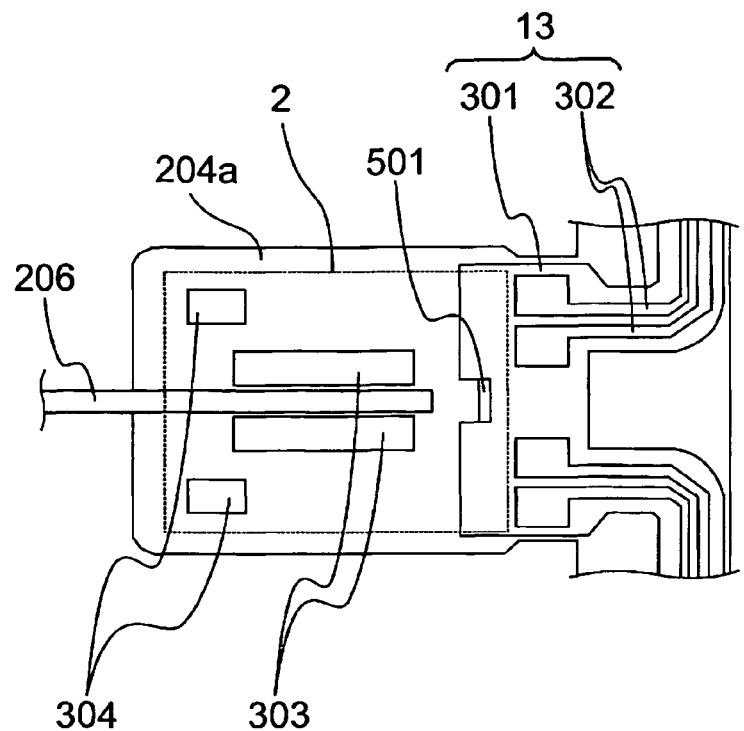
FIG. 5 is a view showing a head gimbal assembly according to a second embodiment of the invention.

Hereinafter, a second embodiment of the invention will be described with reference to FIG. 5. Like components are labeled with like reference numerals with respect to the first embodiment above and a detailed description is omitted herein.

This embodiment is different from the first embodiment above in that the end face of the flexible substrate 301 is notched in a rectangular shape in a portion opposing the optical fiber 206 and a mirror surface 501 is provided to one surface opposing the optical fiber 206 among the side surfaces of this notch. As in the first embodiment above, the mirror surface 501 is an inclined plane inclined by 45 degrees with respect to the longitudinal direction of the optical fiber 206 and coated with metal.

Owing to this configuration, it becomes possible to introduce light to where it is the closest possible proximity to the flow-out end of the slider 2 while ensuring the size of a region of the flexible substrate 301 on which the slider 2 is mounted. Because the slider 2 can be fixed to the flexible substrate 301 in a stable manner, the assembling yield can be enhanced and deterioration of the vibration characteristic between the slider 2 and the flexure 204 can be prevented. In addition, because the near-field light element provided to the slider 2 can be provided in close proximity to the flow-out end, the slider 2 can be readily fabricated.

Third Embodiment

Figure 6:
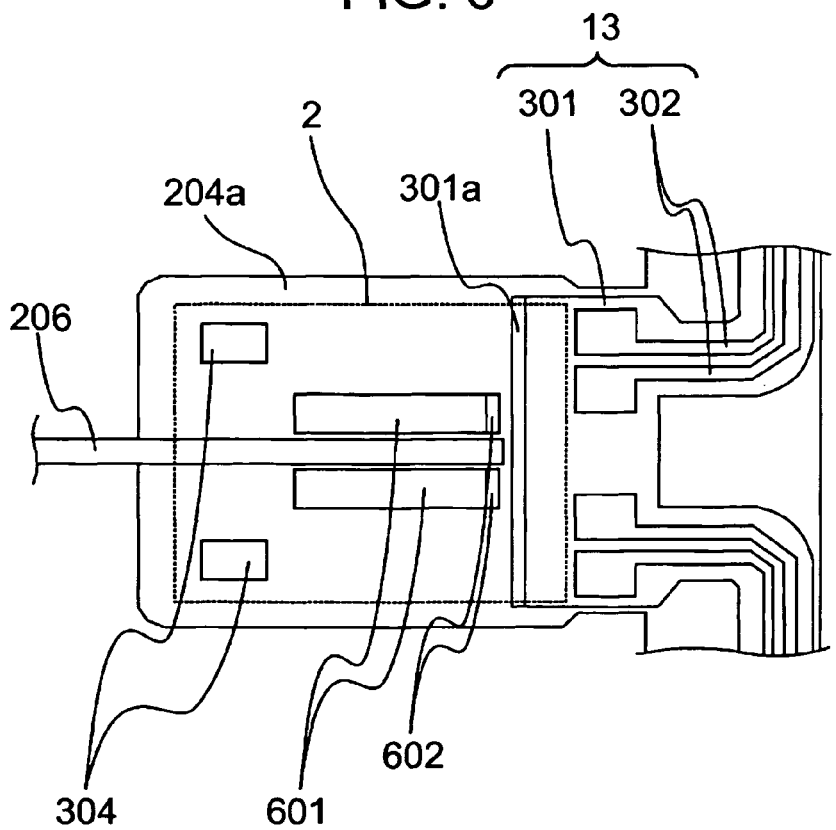
FIG. 6 is a view showing a head gimbal assembly according to a third embodiment of the invention.

Hereinafter, a third embodiment of the invention will be described with reference to FIG. 6. Like components are labeled with like reference numerals with respect to the first embodiment above and a detailed description is omitted herein. This embodiment is different from the first embodiment above in that of the end faces of each fiber guide 601, one end face opposing the mirror surface 301a is formed as an inclined plane 602.

Owing to this configuration, a dicing blade with an edge having a V-shaped cross section or a trapezoidal cross section can be used when forming the inclined plane from which the mirror surface 301a is obtained. The structure can be therefore processed readily at a low cost. Further, because a distance between the fiber guides 601 and the mirror surface 301a can be shortened, the optical fiber 206 can be fixed up to the vicinity of the mirror surface 301a with the fiber guides 601. Hence, the optical axis of light exiting from the optical fiber 206 is hardly disturbed and energy can be transmitted efficiently to the near-field light element.

Fourth Embodiment

Figure 7:
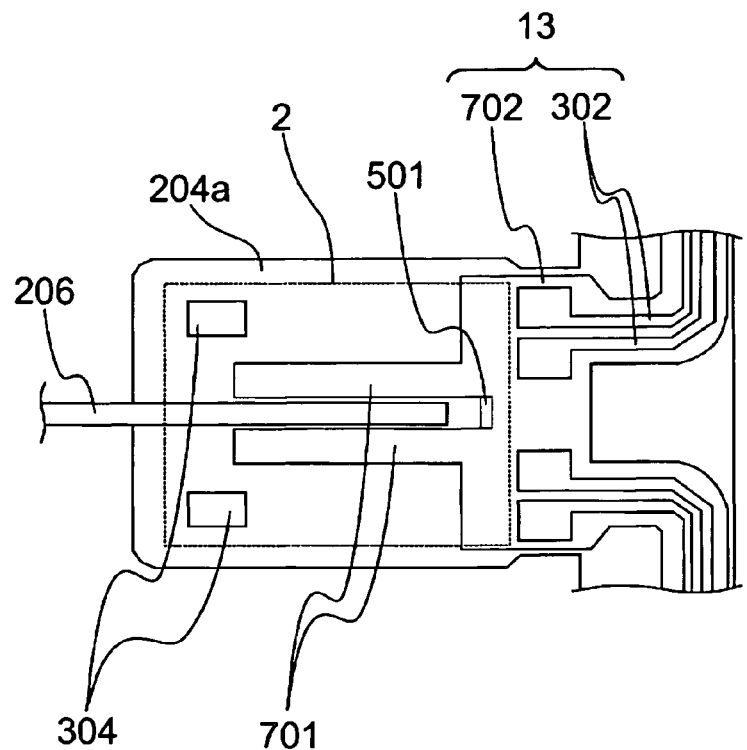
FIG. 7 is a view showing a head gimbal assembly according to a fourth embodiment of the invention.

Hereinafter, a fourth embodiment of the invention will be described with reference to FIG. 7. Like components are labeled with like reference numerals with respect to the first and second embodiments above and a detailed description is omitted herein. This embodiment is different from the second embodiment above in that fiber guides 701 and a flexible substrate 702 are formed integrally into one piece.

Owing to this configuration, the optical fiber 206 can be fixed up to the vicinity of the mirror surface 501 with the fiber guides 601. Hence, the optical axis of light exiting from the optical fiber 206 is hardly distributed and energy can be transmitted efficiently to the near-field light element.

Fifth Embodiment

Hereinafter, a fifth embodiment of the invention will be described with reference to FIG. 8 through FIG. 11. Like components are labeled with like reference numerals with respect to the first embodiment above and a detailed description is omitted herein.

A difference from the first embodiment above is that a photoelectric composite wire 801 is provided on the flexure 204 instead of the flexible wire 13. A laser 205 is disposed on the photoelectric composite wire 801 and electrically and optically connected to the photoelectric composite wire 801. Alternatively, the laser 205 may be disposed in the vicinity of the carriage 11 or the control portion 5.

Figure 8:
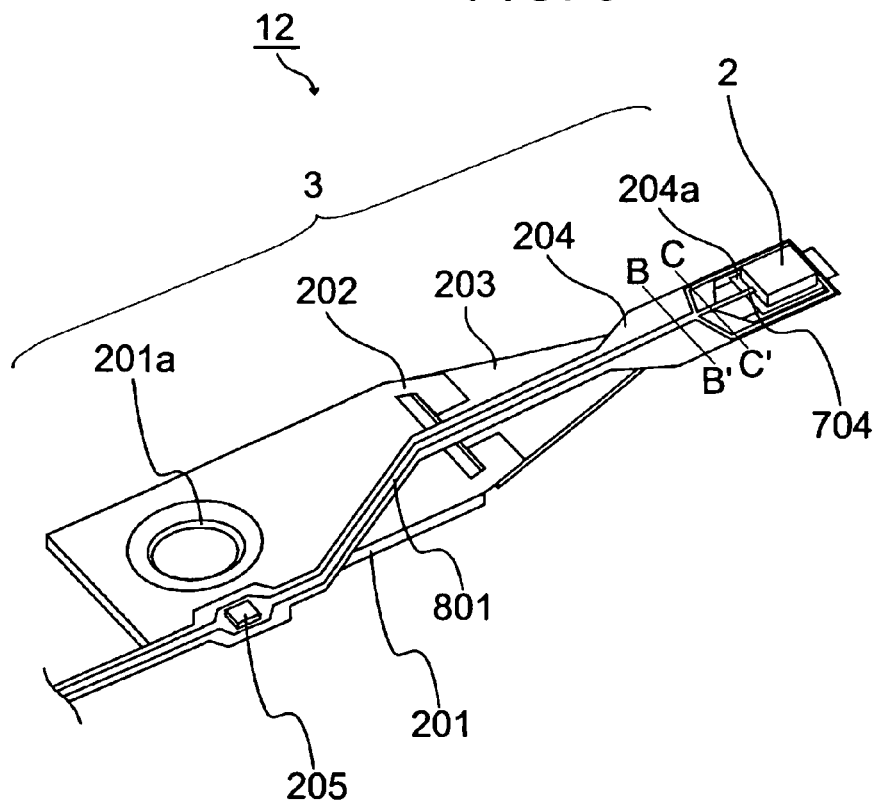
FIG. 8 is a perspective view of a head gimbal assembly according to a fifth embodiment of the invention.
Figure 9:
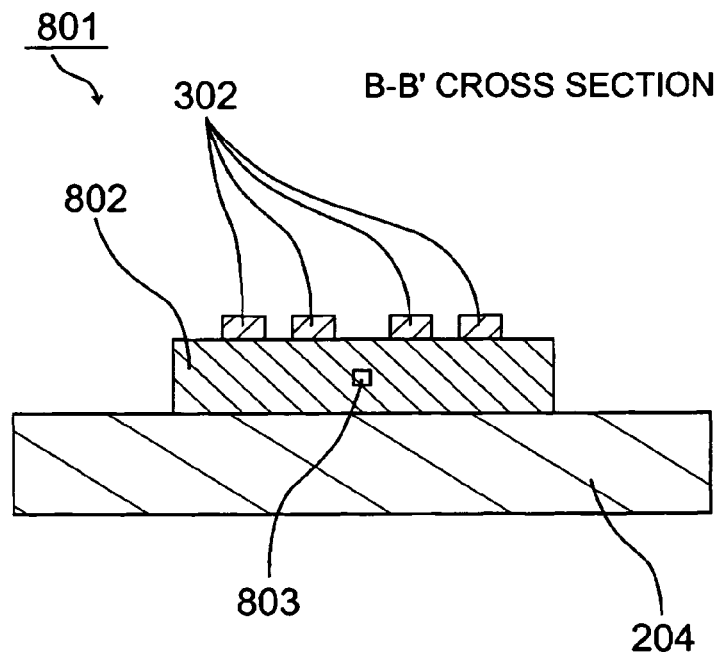
FIG. 9 is a cross section taken on line B-B' of FIG. 8.

FIG. 9 is a cross section of the flexure 204 and the photoelectric composite wire 801 taken on line B-B' of FIG. 8. The photoelectric composite wire 801 is of a configuration similar to the configuration of the flexible wire 13 of the first embodiment above except that a waveguide core 803 having a rectangular cross section is provided inside a flexible substrate 802. The waveguide core 803 has a cross section measuring several μm to several hundreds gm per side and it is made of a light-transmitting resin material. It is preferable to use, for example, light-transmitting polyimide. The flexible substrate 802 has a refractive index smaller than that of the waveguide core 803 and it is made of a non-conductive resin material. It is also preferable to use light-transmitting polyimide. Four metal wires 302 are provided on the flexible substrate 802.

Figure 10:
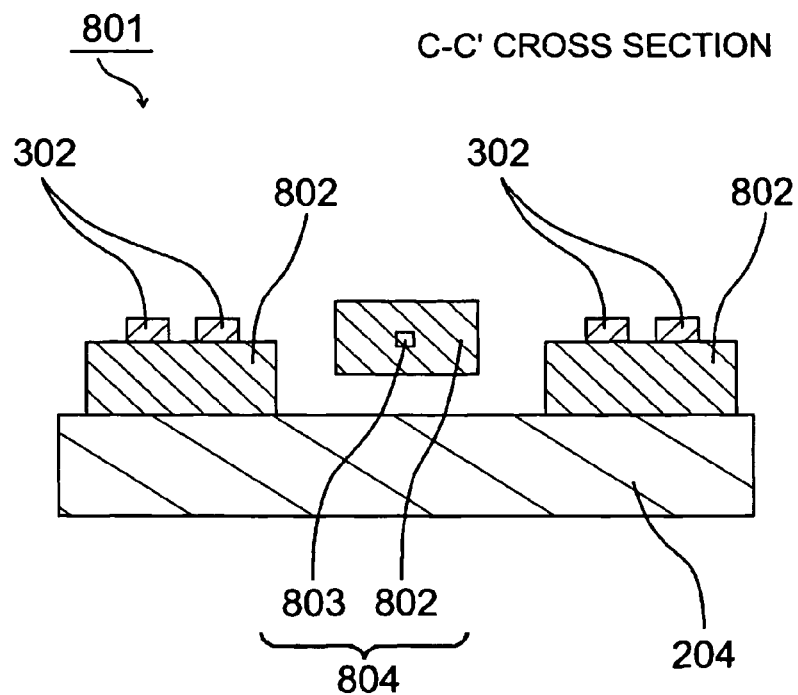
FIG. 10 is a cross section taken on line C-C' of FIG. 8.

FIG. 10 is a cross section of the flexure 204 and the photoelectric composite wire 801 taken on line C-C' of FIG. 8. In this embodiment, the metal wires 302 are divided to two sets and connected to the flow-out end of the slider 2 while circling around the flexure opening that forms the pad portion 204a as in the first embodiment above, and further, a waveguide 804 formed of the waveguide core 803 and the flexible substrate 802 surrounding the waveguide core 803 branches, too. More specifically, the photoelectric composite wire 801 extended from the root of the suspension 3 branches to a total of three wires: two sets of metal wires and one waveguide, which are provided to the pad portion 204a. The waveguide 804 is inserted from the flow-in end of the slider 2. This is because an optical waveguide is generally less resistant to bending than an electric wire and it cannot be installed so as to circle around the slider 2.

Figure 11:
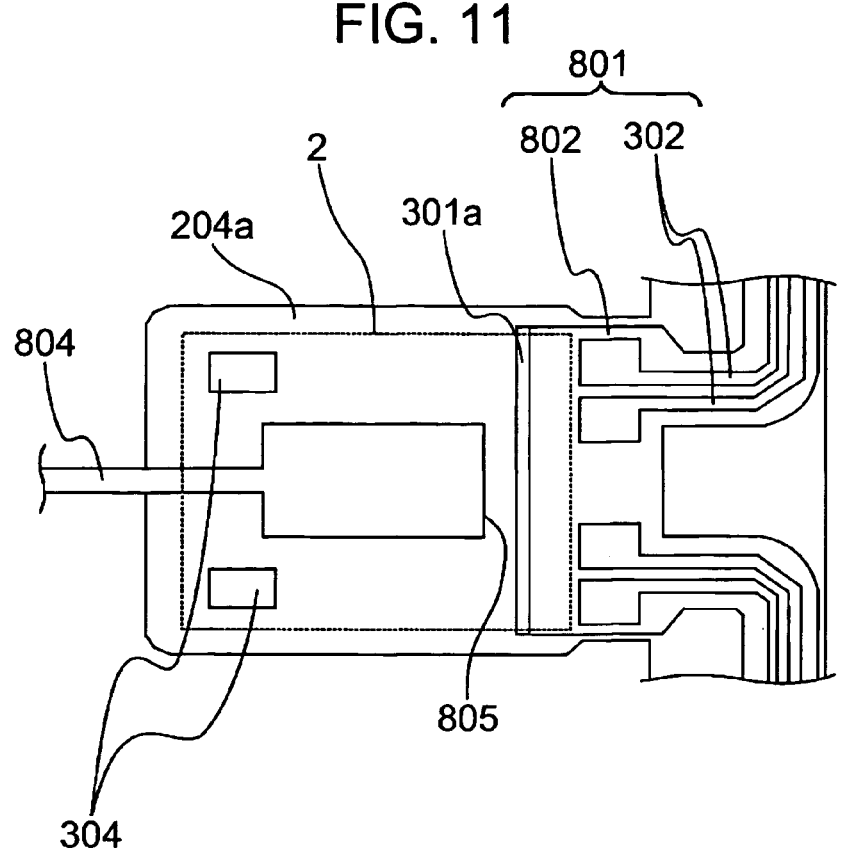
FIG. 11 is an enlarged view of the head gimbal assembly shown in FIG. 8.

FIG. 11 is an enlarged view in the vicinity of the pad portion 204a of this embodiment. The waveguide 804 provided to the pad portion 204a from the flow-in end of the slider 2 has an end portion 805 on the pad portion 204a. The waveguide core 803 is exposed to the end portion 805 for light from the laser 205 to exit. The metal wires 302 are mounted on the flexible substrate 802, and on the end face of thereof opposing the end portion 805, a mirror surface 301a is formed in the same manner as in the first embodiment above. Light exiting from the waveguide core 803 is therefore bent by 90 degrees on the mirror surface 301a and introduced into the near-field light element (not shown) provided inside the slider 2. Accordingly, the laser 205 is driven by an electric signal from the control portion 5 and light from the laser 205 is introduced into the near-field light element provided to the slider 2 by the waveguide core 803 inside the photoelectric composite wire 801 and the mirror surface 301a. The slider 2 is bonded and fixed so as to be mounted on the flexible substrate 802 in the vicinity of the mirror surface 301a, the waveguide 804 in the vicinity of the end portion 805, and the spacers 304. When a load is applied to the waveguide 804, the waveguide performance is susceptible to adverse influences. Hence, in order to disperse the load, the waveguide 804 is widened at least in a part of a portion on which the slider 2 is mounted.

Owing to this configuration, in addition to the advantages of the first embodiment above, the head gimbal assembly 12 can be fabricated efficiently because the waveguide core 803 and the metal wires 302 are formed integrally into one piece as the photoelectric composite wire 801.

Sixth Embodiment

Hereinafter, a sixth embodiment of the invention will be described with reference to FIG. 12 and FIG. 13. Like components are labeled with like reference numerals with respect to the first embodiment above and a detailed description is omitted herein. This embodiment is different from the first embodiment above in that the optical fiber 206 is eliminated and the position of the laser is consequently changed.

Figure 12:
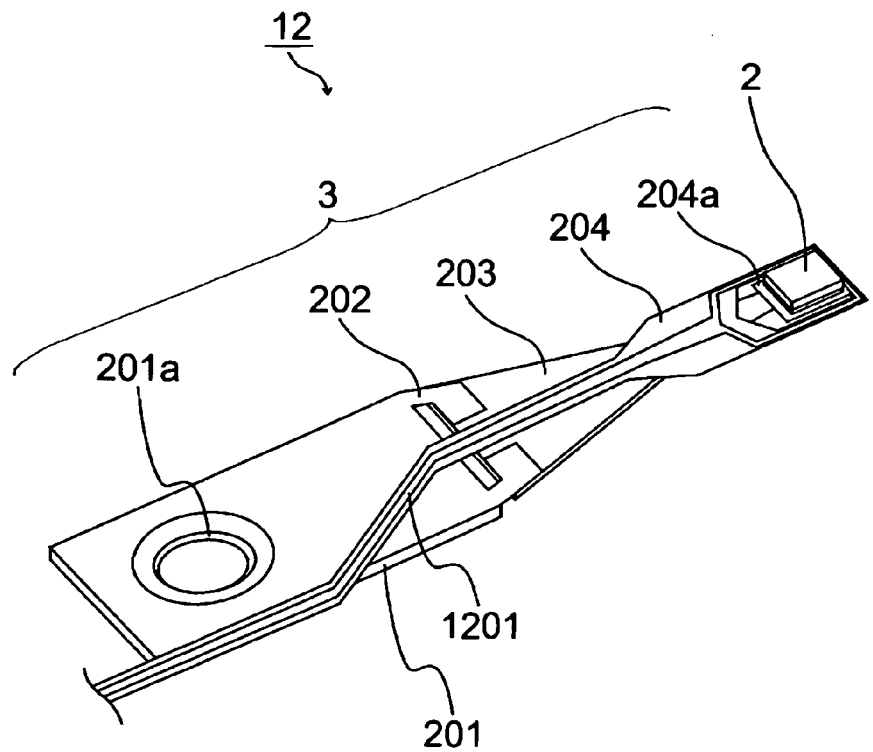
FIG. 12 is a perspective view of a head gimbal assembly according to a sixth embodiment of the invention.

FIG. 12 is an enlarged view of a head gimbal assembly 12 of the sixth embodiment. A flexible wire 1201 is provided on the flexure 204.

Figure 13:
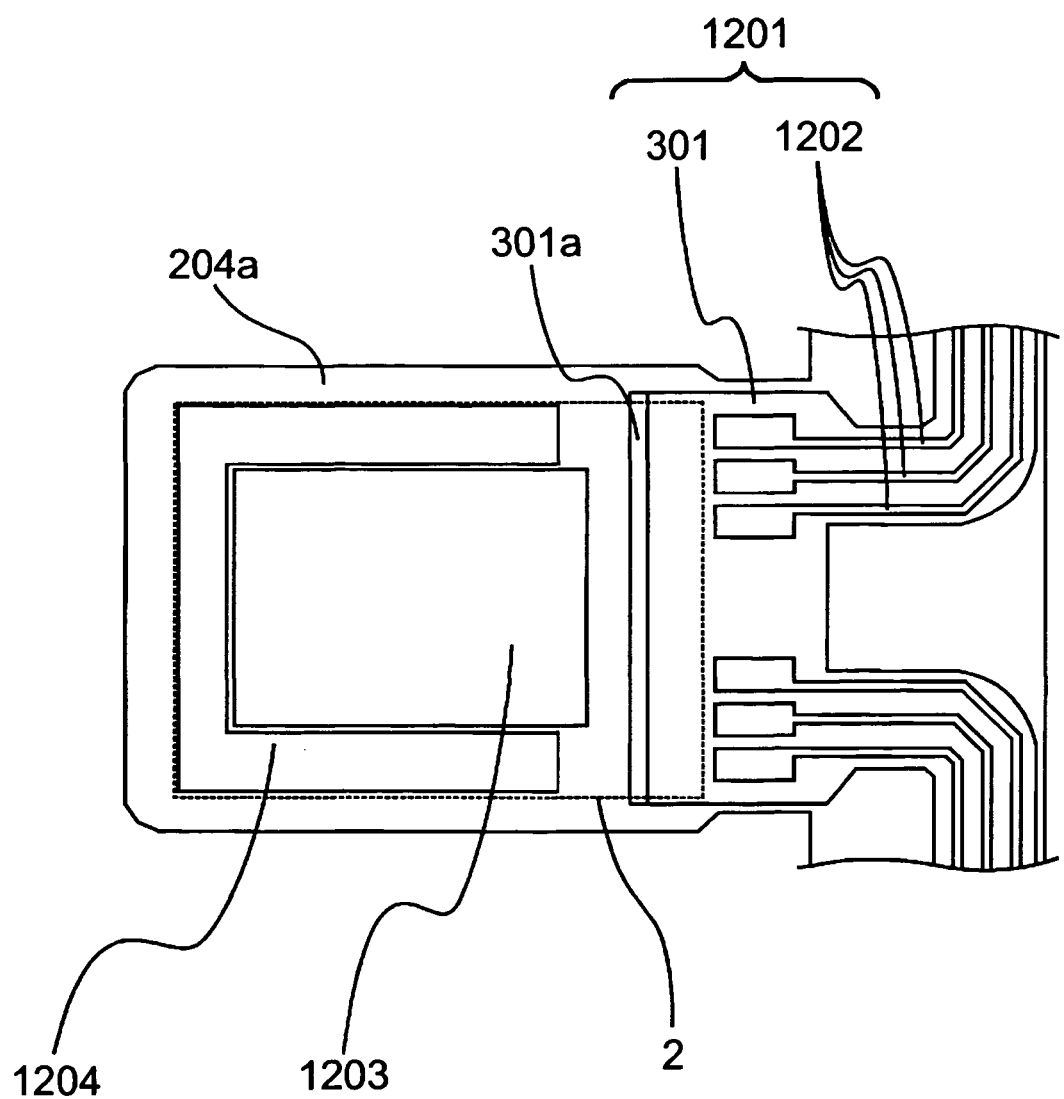
FIG. 13 is an enlarged view of the head gimbal assembly shown in FIG. 12.

FIG. 13 is an enlarged view in the vicinity of the pad portion 204a of the sixth embodiment. The flexible wire 1201 is formed of a flexible substrate 301 and six metal wires 1202 mounted thereon. The metal wires 1202 are made of copper and the surfaces thereof are plated with gold. The flexible substrate 301 electrically isolates the metal wires 1202 from the flexure 204. Although it is not shown in the drawing, a part of the metal wires 1202 is coated with resin, such as polyimide, as a protective overcoat. Of the six metal wires 1202, four metal wires 1202 are connected to a magnetic pole (not shown) and a reproduction element (not shown) provided to the slider 2; two to the former and the other two to the latter. A laser 1203 is disposed on the pad portion 204a. Also, a laser guide 1204 in the shape of a capital U when viewed in a plane is disposed on the pad portion 204a. The laser guide 1204 is made of the same material and of the same thickness as the flexible substrate 301. The laser guide 1204 and the flexible substrate 301 can be therefore formed simultaneously. The laser 1203 is fit in the laser guide 1204 in the shape of a capital U when viewed in a plane and is therefore readily positioned. Because the laser 1203 is an end-emitting laser, a laser beam is emitted from the side surfaces thereof. The laser guide 1204 is formed not to interfere with a laser beam emitted from the side surfaces of the laser 1203. The laser 1203 is as thick as or thinner than the laser guide 1204. The slider 2 is fixed so as to be mounted on a part of the flexible substrate 301 and on the laser 1203 and the laser guide 1204. Of the six metal wires 1202, two metal wires 1202 connected to neither the magnetic pole nor the reproduction element are connected to the laser 1203 via an electrode (not shown) on the surface of the slider 2 to drive the laser 1203. Hence, light emitted from the laser 1203 disposed to be sandwiched between the slider 2 and the pad portion 204a is bent by 90 degrees on the mirror surface 301a and introduced into the near-field light element (not shown) provided inside the slider 2. Owing to this configuration, the advantages of the first embodiment above can be achieved even when the laser mounting position is changed.

Seventh Embodiment

Hereinafter, a seventh embodiment of the invention will be described with reference to FIG. 14 through FIG. 16J. Like components are labeled with like reference numerals with respect to the first embodiment above and a detailed description is omitted herein. This embodiment is different from the first embodiment in that an optical waveguide is provided inside a flexible substrate and a mirror surface is provided by further forming a notch in the optical waveguide.

A flexible wire 2013 is provided on the flexure 204 and the flexible wire 2013 is formed of a flexible substrate 2301 and electric wires 3302 mounted thereon. A core 3303 of an optical waveguide is provided inside the flexible substrate 2301. The core 3303 of the optical waveguide is provided to bridge across openings 3205 of the flexure 204 and a notch 3310 is provided to the end face of the core 3303 on the side of the slider 2. The electric wires 3302 are connected to respective connection pads 3320. The notch 3310 is provided to be closer to the tip end (free end) of the suspension 3 than a connecting point of the electric wires 3302 and the connection pads 3320. It thus becomes possible to form the notch 3310 without cutting or deforming the electric wires 3302. It should be noted that the notch 3310 forms a mirror surface.

The electric wires 3302 of the flexible wire 2013 are electrically connected to the slider 2 by way of the connection pads 3320 and the core 3303 is optically connected to the slider 2 by way of the notch 3310. The respective electric wires 3302 and core 3303 of the flexible wire 2013 are electrically and optically connected to the control portion 5. An electronic circuit in the control portion 5 and the laser are therefore electrically and optically connected to the slider 2.

Figure 14:
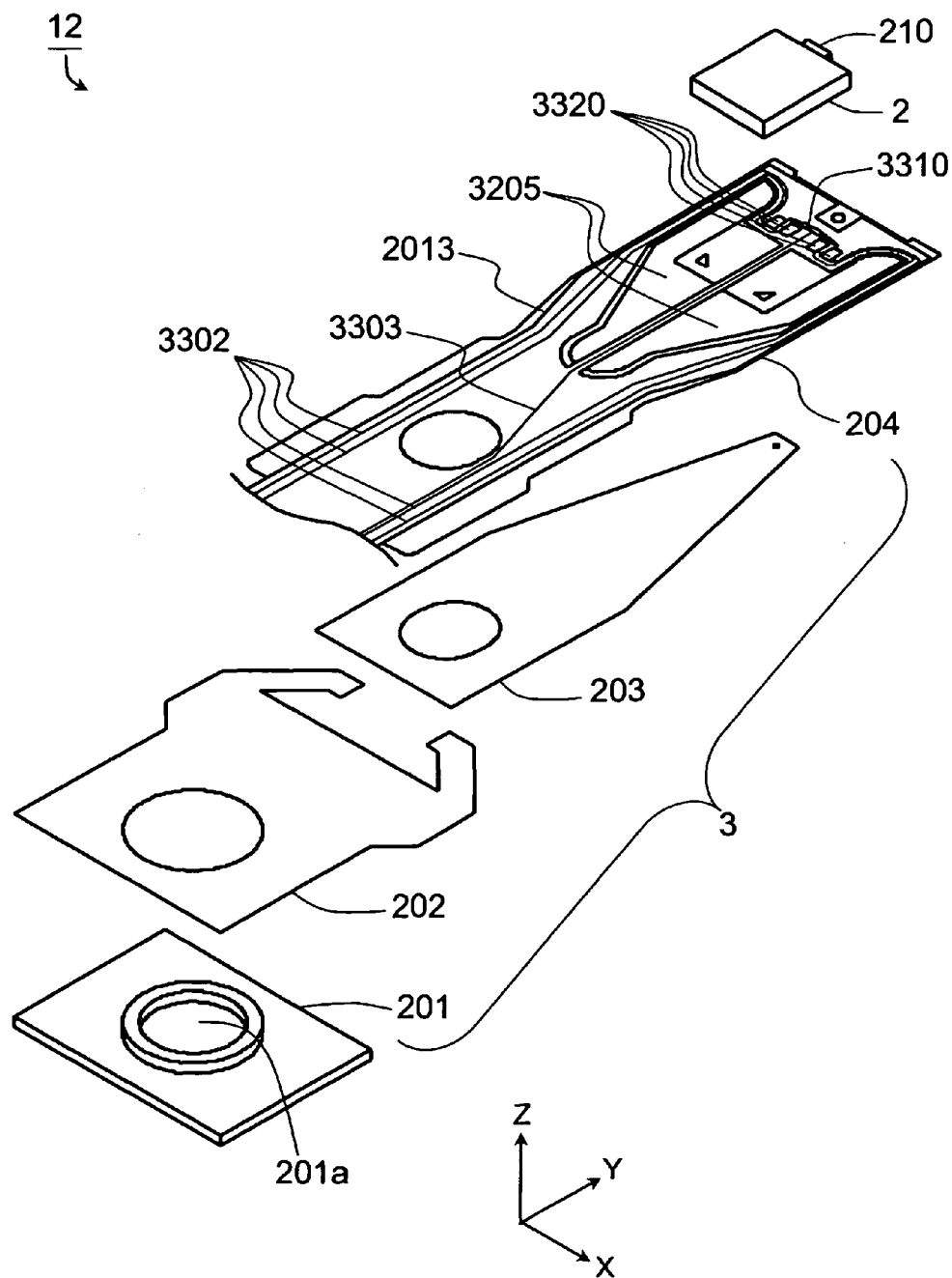
FIG. 14 is a view showing the configuration of a head gimbal assembly according to a seventh embodiment of the invention.
Figure 15:
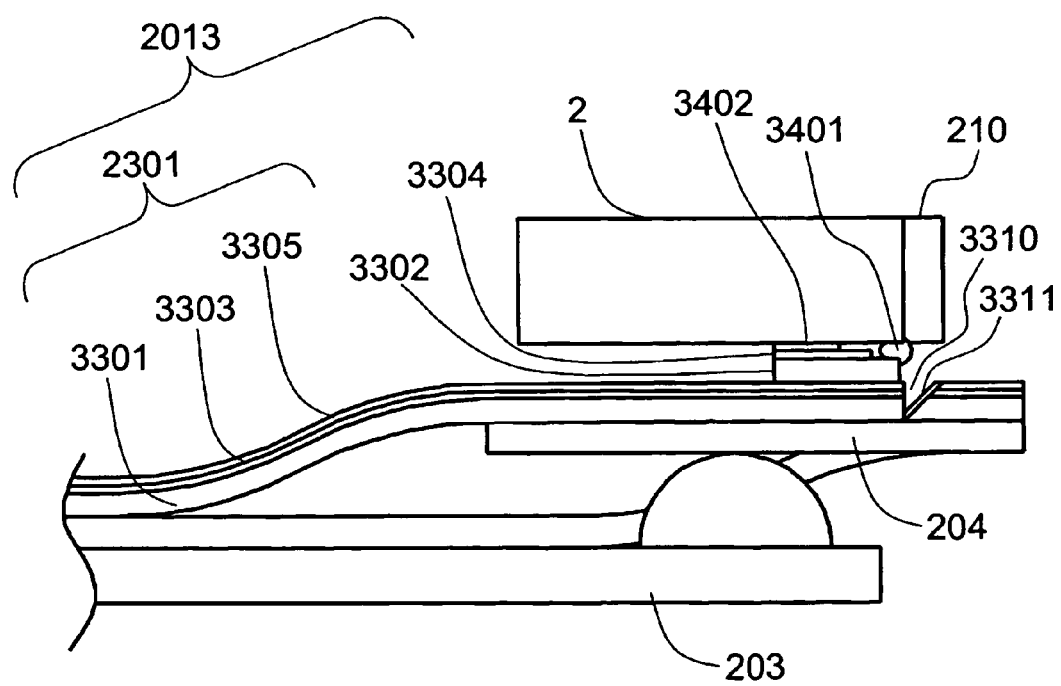
FIG. 15 is a cross section used to describe the head gimbal assembly according to the seventh embodiment of the invention.

FIG. 15 is a cross section of the flexure 204, the flexible wire 2013, and the slider 2. It is a cross section on a plane parallel to the Y-Z plane of FIG. 14. The flexible wire 2013 is formed of a base clad layer 3301 formed on the flexure 204, the core 3303 formed on the base clad layer 3301, a cover clad layer 3305 covering the core 3303, the electric wires 3302 and a cover layer 3304 covering the electric wires 3302 formed on the cover clad layer 3305, and the notch 3310 provided at the end of the core 3303. The base clad layer 3301 and the cover clad layer 3305 have the same optical refractive index, and the core 3303, the base clad layer 3301, and the cover clad layer 3305 together form an optical waveguide as they are formed under the strict management of the optical refractive index. The electric wires 3302 are made of a material, such as copper, aluminum, and gold. The cover clad layer 3305 and the cover layer 3304 provide electrical isolation for the electric wires 3302. Each of the base clad layer 3301, the cover layer 3304, the core 3303, and the cover clad layer 3305 is made of resin, such as polyimide. The slope (mirror surface) of the notch 3310 has an angle of 45° with respect to the flexure 204 and a reflection film 3311 is formed by providing a thin film of gold, aluminum, or the like on the slope surface.

It should be noted that because the core 3303 inside the flexible wire 2013 is formed linearly or bent at a large curvature radius, light propagating through inside the core 3303 hardly attenuates and reaches the notch 3310.

Light exiting from the core 3303 propagates through air inside the notch 3310, after which the light is reflected on the reflection film 3311 provided on the slope of the notch 3310 and goes incident on a near-field light generation element 210 provided to the slider 2. Light that has come incident on the near-field light generation element 210 generates near-field light on the ABS of the slider 2 and heats a microscopic region of a recording medium D.

The electric wires 3302 are electrically connected to electric pads, a magnetic pole, and a reproduction element (none of which is shown) provided to the side surface of the slider 2 by way of a solder bump 3401.

Owing to this configuration, it becomes possible to control the magnetic pole and the reproduction element provided to the slider 2 by a signal from the electronic circuit in the control portion 5. In addition, because it is possible to heat a desired region of the recording medium D with near-field light from the near-field light generation element 210 provided in the vicinity of the magnetic pole, information can be recorded into and reproduced from the recording medium D.

FIGS. 16A through 16J show the fabrication sequence of the head gimbal assembly 12 of this embodiment to describe, in particular, a manufacturing method of the flexible wire 2013 and a connecting and fixing method of the flexible wire 2013 and the slider 2. Herein, cross sections in a plane parallel to the Y-Z plane of FIG. 14 are shown.

Figure 16A:
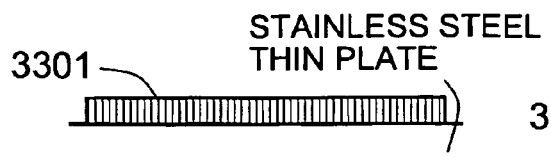
FIGS. 16A through 16J are views used to describe a manufacturing method of the head gimbal assembly according to the seventh embodiment of the invention.
Figure 16B:
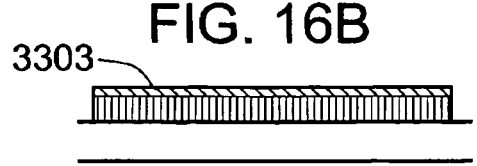
Figure 16C:
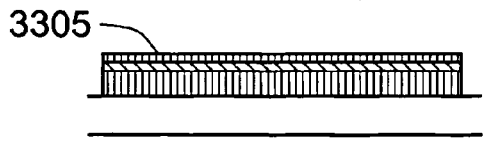
Figure 16D:
Figure 16E:
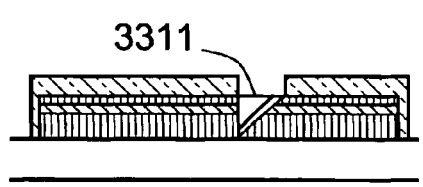
Figure 16F:
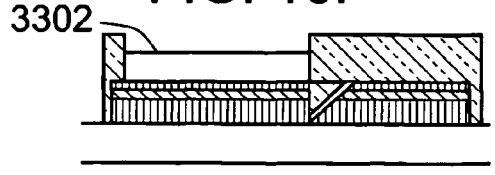
Figure 16G:
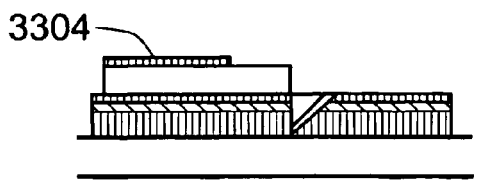

Photosensitive polyimide is applied on a thin plate of stainless steel. Exposure and development are carried out to form the base clad layer 3301 (FIG. 16A). After resist is applied on the base clad layer 3301 and exposure and development are carried out, the core 3303 is formed (FIG. 16B). After the resist is removed, photosensitive polyimide is applied and exposure and development are carried out to form the cover clad layer 3305 (FIG. 16C). Subsequently, the base clad layer 3301, the core 3303, and the cover clad layer 3305 are cut out partially using a slitter cutter having an inclination of 45° on one side to form the notch 3310 at a predetermined position (FIG. 16D). After the slope portion is protected with resist, aluminum is vapor-deposited on the slope portion to form the reflection film 3311 (FIG. 16E). After the resist is removed, another resist is applied followed by exposure and development. Thereafter, the electric wires 3302 made of copper are formed (FIG. 16F). After the resist is removed, photosensitive polyimide is applied. Exposure and development are then carried out to form the cover layer 3304 (FIG. 16G). Consequently, the flexible wire 2013 is formed.

Figure 16H:
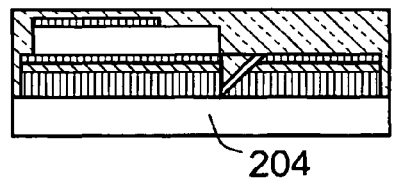
Figure 16I:
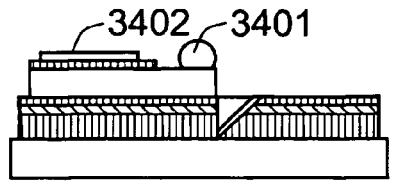
Figure 16J:
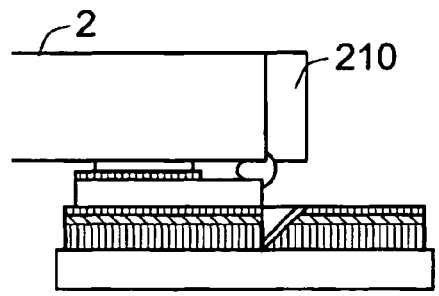

After the flexible wire 2013 is protected entirely with resist or the like, the thin plate of stainless steel is etched to form the flexure 204 (FIG. 16H). After the resist is removed, the load beam 203 of the suspension 3 formed separately is fixed to the flexure 204 by laser welding. The solder bump 3401 is printed on an exposed portion of the electric wires 3302 and a thermosetting adhesive 3402 is applied to the cover layer 3304 (FIG. 16I). The slider 2 is located at the predetermined position of the flexible wire 2013 and heated. The solder bump 3401 then melts, so that the electric wires 3302 and the electric wire of the slider 2 are electrically connected while the slider 2 is fixed to the cover layer 3304 with the adhesive 3402 (FIG. 16J).

Owing to this configuration, light from the laser hardly attenuates and goes incident on the near-field light generation element 210, which makes it possible to emit high-intensity near-field light from the slider 2. Also, because no large optical components are mounted on the slider 2, a total height of the slider 2 hardly changes. The slider 2 is thus allowed to levitate in a stable manner and the slider 2 is allowed to come in close proximity to the recording medium D. It thus becomes possible to maintain a constant distance from the recording medium D to the magnetic pole, the near-field light generation element 210, and the reproduction element, which can in turn achieve precise and stable recording and reproduction. In addition, because the electric wires 3302, the optical waveguide, and the optical connection portion to the near-field light emitting element 210 can be formed integrally into the single flexible wire 2013, the head gimbal assembly 12 can be fabricated at a low cost.

Eighth Embodiment

Figure 17:
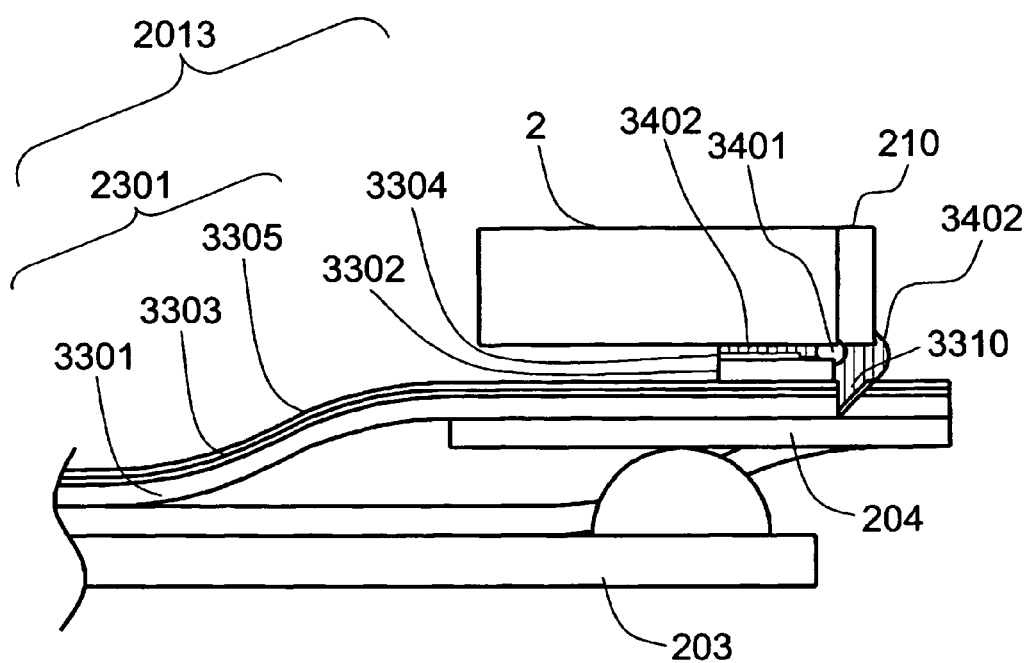
FIG. 17 is a cross section used to describe a head gimbal assembly according to an eighth embodiment of the invention.

Hereinafter, an eighth embodiment of the invention will be described with reference to FIG. 17. Like components are labeled with like reference numerals with respect to the seventh embodiment above and a detailed description is omitted herein. This embodiment is different from the seventh embodiment above in that the notch 3310 is filled with the adhesive 3402.

Owing to this configuration, the bonding area between the slider 2 and the flexible wire 2013 becomes wider and bonding strength can be increased. Further, by using an optical adhesive, in particular, the one having the same refractive index as the core 3303 of the optical waveguide, as the adhesive 3402, reflected light from the end face of the core 3303 becomes smaller and an amount of light that goes in the notch 3310 and incident on the near-field light generation element 210 increases. It thus becomes possible to generate further larger near-field light.

Ninth Embodiment

Hereinafter, a ninth embodiment of the invention will be described with reference to FIG. 18. Like components are labeled with like reference numerals with respect to the seventh embodiment above and a detailed description is omitted herein. This embodiment is different from the seventh embodiment above in that the slope of the notch 3310 has a different angle.

As is shown in FIG. 18, the angle of the slope of the notch 3310 is not limited to 45° and the slope can be also formed at about 60°. In this case, by providing a grating inside the near-field light generation element 210, the travel direction of light coming incident diagonally on the near-field light generation element 210 can be changed, so that the light propagates through in a direction that crosses at right angles with the ABS of the slider 2. At the same time, it becomes possible to secure a region in which to provide the electric wires 3302 between the notch 3310 and the connection pads 3320.

Accordingly, when the notch 3310 is formed, more than one flexible wire 2013 can be processed collectively by a slitter cutter or the like.

Further, by forming the slope of the notch 3310 in a concave shape, a concave mirror can be formed. It thus becomes possible to collect light first and thence to allow the collected light to go incident on the near-field light generation element 210.

The description was given using the notch 3310 as an example of the mirror surface. It goes without saying, however, that the mirror surface is not limited to this example. For example, the tip end of the core 3303 may be cut diagonally, so that light is reflected on the slope at the tip end. Also, it is preferable that the angle of the slope with respect to the optical axis is an angle at which light is reflected under the condition of total reflection.

Tenth Embodiment

Hereinafter, a tenth embodiment of the invention will be described with reference to FIG. 19. Like components are labeled with like reference numerals with respect to the seventh embodiment above and a detailed description is omitted herein. This embodiment is different from the seventh embodiment above in that the end face of the core 3303 of the optical waveguide is formed as a slope.

As is shown in FIG. 19, the end face of the core 3303 of the optical waveguide is formed with an inclination at several degrees. Owing to this configuration, even when light propagating through the core 3303 is reflected on the end face, because the end face is not in a propagation mode of the optical waveguide, reflected light does not propagate through to the laser. The laser therefore oscillates in a stable manner and stable light can be supplied to the optical waveguide and hence to the near-field light generation element 210. It thus becomes possible to generate stable near-field light.

Eleventh Embodiment

Hereinafter, an eleventh embodiment of the invention will be described with reference to FIGS. 20A through 20D. Like components are labeled with like reference numerals with respect to the seventh embodiment above and a detailed description is omitted herein. This embodiment is different from the seventh embodiment above in a positional relation of the core 3303 and the electric wires 3302 inside the flexible wire 2013.

FIGS. 20A through 20D show the fabrication sequence to form the bottom surfaces of the core 3303 and the electric wires 3302 on the same plane. Herein, cross sections in a plane parallel to the X-Z plane of FIG. 14 are shown.

Figure 20A:
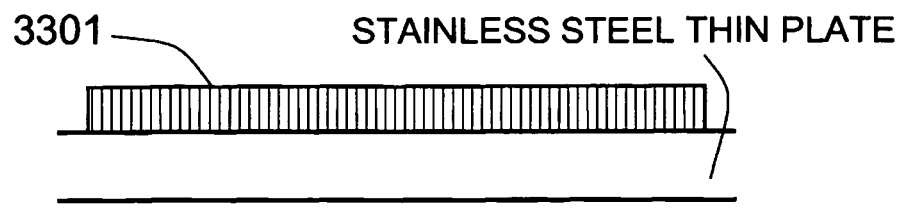
FIGS. 20A through 20D are views used to describe a manufacturing method of a head gimbal assembly according to an eleventh embodiment of the invention.
Figure 20B:
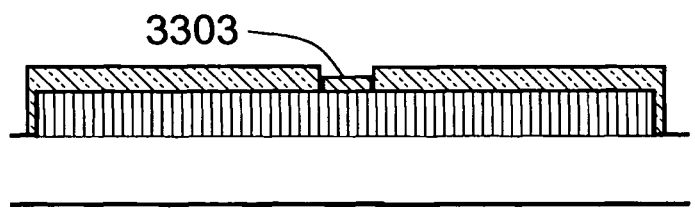
Figure 20C:
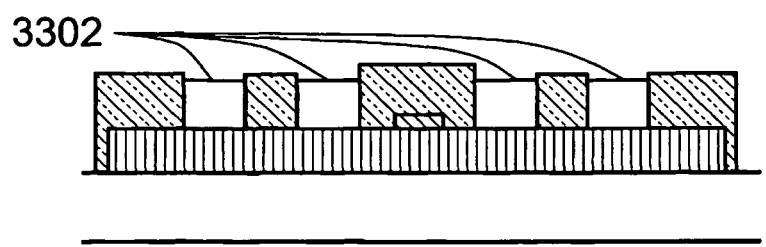
Figure 20D:
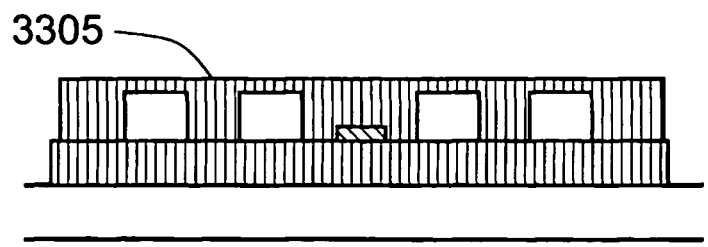

More specifically, photosensitive polyimide is applied on a thin plate of stainless steel. Exposure and development are carried out to form the base clad layer 3301 (FIG. 20A). After resist is applied on the base clad layer 3301 and exposure and development are carried out, the core 3303 is formed (FIG. 20B). After the resist is removed, another resist is applied and exposure and development are carried out. Thereafter, the electric wires 3302 made of copper are formed (FIG. 20C). After the resist is removed, photosensitive polyimide is applied and exposure and development are carried out to form the cover clad layer 3305 (FIG. 20D). As with the fabrication sequence described above, in the fabrication sequence thereafter, the base clad layer 3301, the core 3303, and the cover clad layer 3305 are cut out partially for each electric wire 3302 using a slitter cutter having an inclination of 45° on one side to form the notch 3310 at the predetermined position. Thereafter, the thin film of stainless steel is etched to form the flexure 204. The flexure 204 is fixed to the load beam 203 of the suspension 3 by laser welding. The solder bump 3401 is printed in an exposed portion of the electric wires 3302 and the slider 2 is fixed and electrically connected to the electric wires 3302 by applying a thermosetting adhesive 3402 to the cover layer 3304.

Owing to this configuration, the positions of the core 3303 and the electric wires 3302 in the flexible wire 2013 are not limited to the positions specified in the configuration of the seventh embodiment above and they can be formed at arbitrarily positions. Also, because the flexible wire 2013 can be made thin, the rigidity of the flexible wire 2013 seldom interferes with deformation of the flexure 204. The slider 2 is therefore allowed to follow the recording medium D, which in turn allows the slider 2 to levitate by coming into extremely close proximity to the recording medium D.

Twelfth Embodiment

Hereinafter, a twelfth embodiment of the invention will be described with reference to FIG. 21 and FIG. 22. Like components are labeled with like reference numerals with respect to the seventh embodiment above and a detailed description is omitted herein. This embodiment is different from the seventh embodiment above in that a light supply portion 3330 is provided inside the flexible wire 2013.

Figure 21:
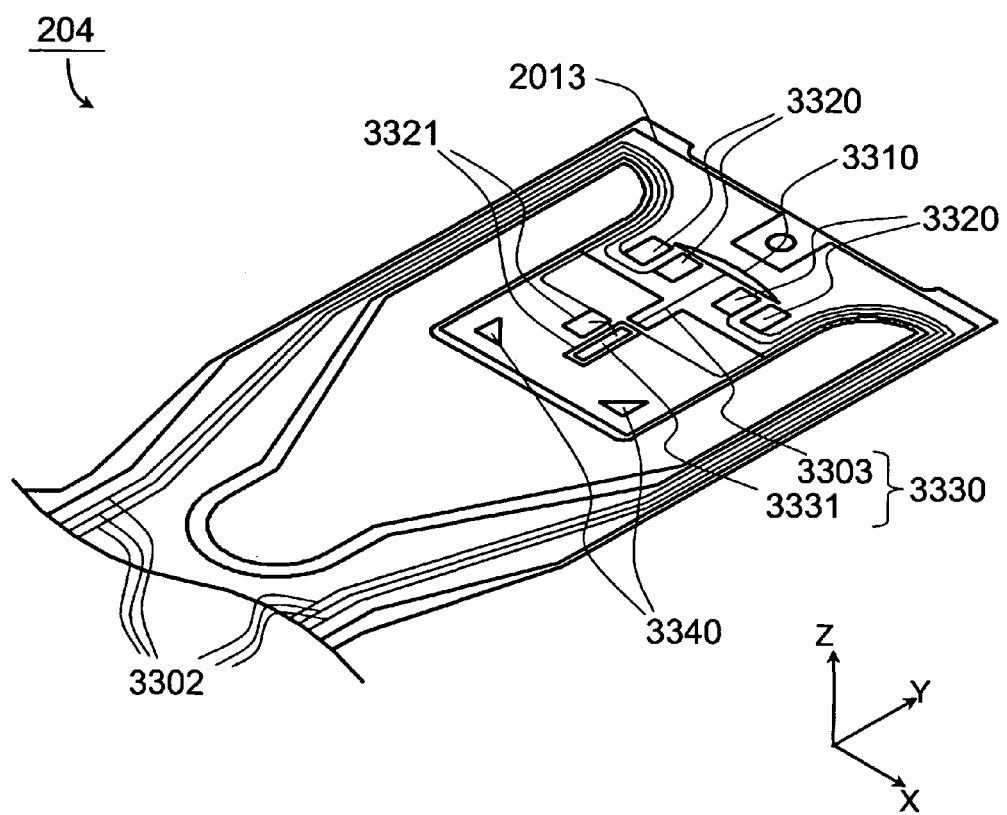
FIG. 21 is a view showing the configuration of a first example of a head gimbal assembly according to a twelfth embodiment of the invention.
Figure 22:
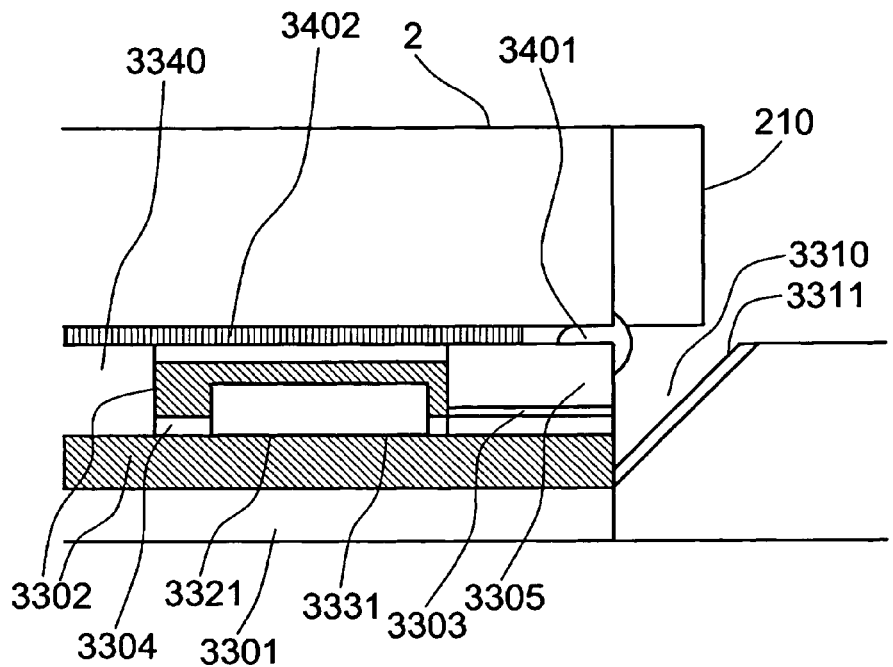
FIG. 22 is a cross section used to describe the first example of the head gimbal assembly according to the twelfth embodiment of the invention.

FIG. 21 shows a part of the flexure 204 of this embodiment. FIG. 22 shows a cross section (the Y-Z plane of FIG. 21) of a portion including the flexible wire 2013 and the slider 2.

More specifically, the light supply portion 3330 and a plurality of electric wires 3302, and slider joint portions 3340 are provided inside the flexible wire 2013. The light supply portion 3330 is formed of the core 3303 of the optical waveguide and a semiconductor laser 3331. The respective electric wires 3302 are electrically connected to the connection pads 3320 and laser connection pads 3321. The slider joint portions 3340 are provided on the periphery of the semiconductor laser 3331 and each is formed to be higher than the semiconductor laser 3331 in the Z direction. Accordingly, the slider joint portions 3340 are formed in such a manner that the surfaces opposing the slider 2 protrude more toward the slider 2 than the surface of the semiconductor laser 3331 opposing the slider 2.

The slider 2 is fixed to the flexible wire 2013 as it is bonded to the slider joint portions 3340 and the cover clad layer 3305.

The laser connection pads 3321 and the semiconductor laser 3331 are electrically connected to each other and the semiconductor laser 3331 is oscillated to emit light by electric signals from the laser connection pads 3321. Light emitted from the semiconductor laser 3331 goes incident on the core 3303 of the optical waveguide and it is reflected from the notch 3310 to go incident on the near-field light generation element 210 provided to the slider 2.

Figure 23:
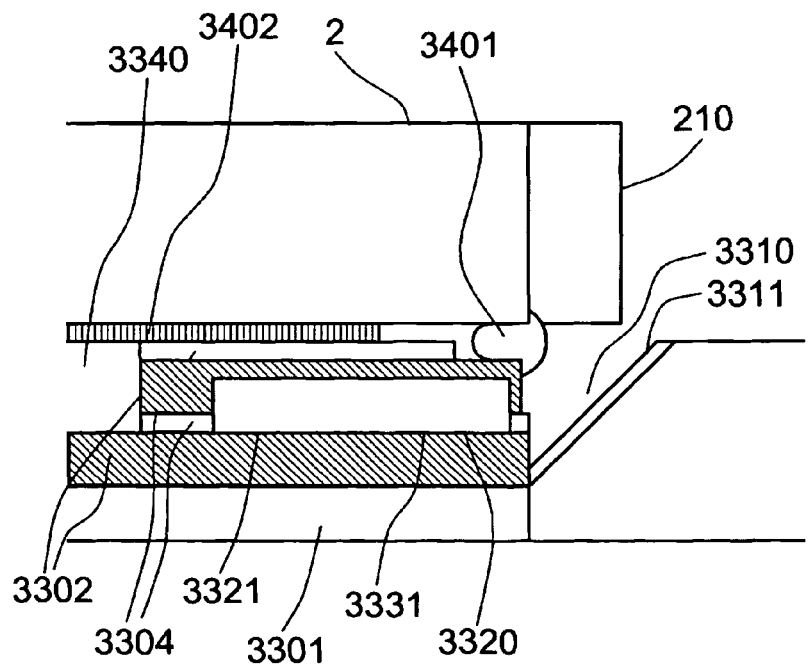
FIG. 23 is a cross section used to describe a second example of the head gimbal assembly according to the twelfth embodiment of the invention.

Alternatively, as is shown in FIG. 23, it is also possible to form the light supply portion 3330 from the semiconductor laser 3331 alone. Light emitted in association with oscillations of the semiconductor laser 3331 directly goes into the notch 3310 and further goes incident on the near-field light generation element 210 provided to the slider 2.

Owing to this configuration, an optical path length from the semiconductor laser 3331 serving as the light source to the near-field light generation element 210 is shortened, which makes it possible to supply high light energy to the near-field light generation element 210. It thus becomes possible to generate high-intensity near-field light. Also, because the configuration in which the core 3303 of the optical waveguide bridges across the openings 205 of the flexure 204 is eliminated, the supporting rigidity of the slider 2 can be lowered. This allows the slider 2 to follow oscillations of the recording medium D more readily, which in turn allows the slider 2 to levitate by coming into extremely close proximity to the recording medium D. Stable and precise information recording can be thus achieved. In addition, because the semiconductor laser 3331 and the slider 2 are not fixed directly to each other, stress, such as a load, is not applied to the semiconductor laser 3331 due to motions of the slider 2. It thus becomes possible to supply stable and high-intensity light.

The light supply portion 3330 is provided inside the flexible wire 2013 and it is therefore preferable that the light supply portion 3330 is as thick as or thinner than the flexible wire 2013.

It should be appreciated that the technical scope of the invention is not limited to the embodiments described above and various modifications added to these embodiments without deviating from the scope of the invention are included in the invention. In other words, configurations in the embodiments described above are mere examples and can be modified as needed. It is also possible to adopt the embodiments described above in a combination selected as needed.

What is claimed is:

1. A head gimbal assembly using near-field light, comprising:
   a flexure forming a part of a suspension configured to extend along a surface of a recording medium;
   a flexible substrate provided on the flexure;
   a slider mounted onto at least a part of the flexible substrate so as to oppose the surface of the recording medium, the slider being configured to generate near field light from an introduced light flux;
   flexible electric wires mounted on the flexible substrate and electrically connected to the slider; and
   a light supply portion mounted on the flexure and provided between the flexure and the slider;
   wherein a side surface of the flexible substrate forms a mirror surface facing an end surface of the light supply portion and being inclined with respect to an optical axis of the light supply portion, the light supply portion being optically coupled to the slider via the mirror surface of the flexible substrate.

2. A head gimbal assembly using near-field light according to claim 1; wherein the electric wires are provided inside the flexible substrate and are electrically isolated from the flexure.

3. A head gimbal assembly using near-field light according to claim 1; wherein the light supply portion forms a part of the flexible substrate.

4. A head gimbal assembly using near-field light according to claim 1; wherein the flexible substrate and at least apart of a portion in the light supply portion mounted on the flexure are made of the same material and have the same thickness.

5. A head gimbal assembly using near-field light according to claim 1; wherein at least a part of the light supply portion is an optical waveguide formed of a core through which the light flux passes and a clad coating the core.

6. A head gimbal assembly using near-field light according to claim 5; wherein the flexible substrate includes the core and the clad.

7. A head gimbal assembly using near-field light according to claim 1; wherein at least a part of the light supply portion is a laser.

8. A head gimbal assembly using near-field light according to claim 1; wherein a metal film is provided to the mirror surface.

9. A head gimbal assembly using near-field light according to claim 1; wherein at least one of the electric wires is connected to the light supply portion.

10. A head gimbal assembly using near-field light according to claim 1; wherein the flexible substrate includes a notch provided with the mirror surface.

11. A head gimbal assembly using near-field light according to claim 10; wherein the notch is formed of a V-shaped groove having a first surface and a second surface; and wherein the first surface is the mirror surface and the second surface is a light-exiting end of the light supply portion.

12. A head gimbal assembly using near-field light according to claim 10; further comprising connection pads provided on the flexible substrate for electrically connecting the slider and the electric wires; wherein the notch is provided closer to a tip end of the suspension than a connecting point of the connection pads and the electric wires.

13. A head gimbal assembly using near-field light according to claim 1; further comprising: a guide provided on the flexure for positioning the light supply portion on the flexure, the guide being made of the same material and having the same thickness as the flexible substrate.

14. A head gimbal assembly using near-field light according to claim 13; wherein the flexible substrate and the guide are formed integrally into one piece.

15. A head gimbal assembly using near-field light according to claim 13; wherein at least one of side surfaces of the guide is inclined with respect to the optical axis of the light supply portion.

16. A head gimbal assembly using near-field light according to claim 1; wherein the light supply portion is as thick as or thinner than the flexure.

17. A head gimbal assembly using near-field light according to claim 5; wherein the suspension includes an opening provided in a part of a periphery of the flexure;
and wherein the optical waveguide is provided so as to bridge across the opening of the suspension.

18. A head gimbal assembly using near-field light according to claim 1; wherein flexible substrate is made of resin.

19. An information recording and reproducing apparatus, comprising:
a recording medium; and
a thermal-assist magnetic recording head gimbal assembly comprising, a flexure forming a part of a suspension configured to extend along a surface of the recording medium, a flexible substrate provided on the flexure, a slider mounted onto at least a part of the flexible substrate so as to oppose the surface of the recording medium and configured to generate near field light from an introduced light flux, flexible electric wires mounted on the flexible substrate and electrically connected to the slider, and a light supply portion mounted on the flexure and provided between the flexure and the slider, wherein a side surface of the flexible substrate forms a mirror surface that is inclined with respect to an optical axis of the light supply portion, the light supply portion being optically coupled to the slider via the mirror surface.

20. A head gimbal assembly using near-field light, comprising:
a flexure forming a part of a suspension configured to extend along a surface of a recording medium;
a flexible substrate provided on the flexure;
a slider mounted onto at least a part of the flexible substrate so as to oppose the surface of the recording medium, the slider being configured to generate near field light from an introduced light flux; and
a light supply portion mounted on the flexure and provided between the flexure and the slider;
wherein an end surface of the flexible substrate forms a mirror surface facing an end surface of the light supply portion and being inclined with respect to an optical axis of the light supply portion, the light supply portion being optically coupled to the slider via the mirror surface of the flexible substrate; and
wherein the mirror surface extends across the entire thickness of the flexible substrate.

21. A head gimbal assembly using near-field light, comprising:
a flexure forming a part of a suspension configured to extend along a surface of a recording medium;
a flexible substrate provided on the flexure;
a slider mounted onto at least a part of the flexible substrate so as to oppose the surface of the recording medium, the slider being configured to generate near field light from an introduced light flux; and
a light supply portion mounted on the flexure and provided between the flexure and the slider;
wherein an end surface of the flexible substrate forms a mirror surface facing an end surface of the light supply portion and being inclined with respect to an optical axis of the light supply portion, the light supply portion being optically coupled to the slider via the mirror surface of the flexible substrate; and
wherein the end surface of the flexible substrate is an inclined plane coated with a metal to form the mirror surface.

* * * * *